United States Patent
Berger et al.

(10) Patent No.: US 9,429,264 B2
(45) Date of Patent: Aug. 30, 2016

(54) WEAR INDICATOR SYSTEM FOR OFFSHORE CORROSION PROTECTION COVERING SYSTEMS

(71) Applicants: Jan Berger, Dortmund (DE); Harald Haeger, Luedinghausen (DE); Markus Hartmann, Sendenhorst (DE); Jasmin Nitsche, Dortmund (DE)

(72) Inventors: Jan Berger, Dortmund (DE); Harald Haeger, Luedinghausen (DE); Markus Hartmann, Sendenhorst (DE); Jasmin Nitsche, Dortmund (DE)

(73) Assignee: Evonik Degussa GmbH, Essen (DE)

( * ) Notice: Subject to any disclaimer, the term of this patent is extended or adjusted under 35 U.S.C. 154(b) by 433 days.

(21) Appl. No.: 13/872,207

(22) Filed: Apr. 29, 2013

(65) Prior Publication Data
US 2013/0284296 A1    Oct. 31, 2013

(30) Foreign Application Priority Data

Apr. 30, 2012    (DE) .................. 10 2012 207 179

(51) Int. Cl.
| | | |
|---|---|---|
| G05D 7/01 | (2006.01) | |
| F16L 55/00 | (2006.01) | |
| B32B 15/08 | (2006.01) | |

(Continued)

(52) U.S. Cl.
CPC .................. *F16L 55/00* (2013.01); *B32B 1/08* (2013.01); *B32B 15/08* (2013.01); *B32B 15/088* (2013.01); *F16L 57/06* (2013.01); *F16L 58/1054* (2013.01); *B32B 2307/202* (2013.01); *B32B 2307/206* (2013.01); *B32B 2597/00* (2013.01)

(58) Field of Classification Search
CPC ........ F16L 57/06; F16L 58/10; F16L 57/109
USPC ........................ 138/143, 138, 139, 145, 104; 428/36.91; 137/1; 405/154.1, 158
See application file for complete search history.

(56) References Cited

U.S. PATENT DOCUMENTS

| | | | | |
|---|---|---|---|---|
| 4,142,555 A | * | 3/1979 | Satake et al. .................. | 138/143 |
| 4,523,141 A | * | 6/1985 | Thomas et al. ................ | 324/557 |

(Continued)

FOREIGN PATENT DOCUMENTS

| | | |
|---|---|---|
| CN | 101914921 | 12/2010 |
| DE | 203 11 617 U1 | 1/2005 |

(Continued)

OTHER PUBLICATIONS

European Search Report issued Jul. 22, 2013, in Patent Application No. 13163842.1 (with English Translation of Categories).

*Primary Examiner* — Patrick F Brinson
(74) *Attorney, Agent, or Firm* — Oblon, McClelland, Maier & Neustadt, L.L.P.

(57) ABSTRACT

A corrosion protected metal pipe for installation in an offshore structure or for producing a pipeline laid in water is provided. The metal pipe has an at least two-layer covering on the pipe with a lower layer facing the pipe and an upper layer on a side of the lower layer not facing the pipe is provided. The layers are formed such that the lower layer is electrically conductive and the upper layer is electrically insulating, the lower layer is optically contrasting to the upper layer, or the lower layer is electrically conducting and optically contrasting to the upper layer and the upper layer is electrically insulating. Thus, in the event of damage to the layer or layers lying above, a visual or electrical signal can be detected. Damage to the corrosion protection covering can therefore be detected easily and, if appropriate, reported by remote monitoring.

24 Claims, 1 Drawing Sheet

(51) Int. Cl.
*B32B 15/088* (2006.01)
*B32B 1/08* (2006.01)
*F16L 58/10* (2006.01)
*F16L 57/06* (2006.01)

(56) References Cited

U.S. PATENT DOCUMENTS

| | | | |
|---|---|---|---|
| 4,589,275 A | * | 5/1986 | Thomas et al. ............ 73/40.5 R |
| 6,913,043 B2 | | 7/2005 | Jacques et al. |
| 6,915,820 B2 | | 7/2005 | Picco et al. |
| 2003/0220449 A1 | | 11/2003 | Jacques et al. |
| 2005/0031894 A1 | * | 2/2005 | Klos et al. ...................... 428/659 |
| 2005/0101745 A1 | | 5/2005 | Jacques et al. |
| 2010/0300572 A1 | | 12/2010 | Dowe et al. |
| 2012/0000541 A1 | * | 1/2012 | Dowe et al. ...................... 137/1 |
| 2012/0257932 A1 | | 10/2012 | Hartmann et al. |

FOREIGN PATENT DOCUMENTS

| | | |
|---|---|---|
| DE | 103 49 109 B4 | 2/2008 |
| DE | 10 2007 040 683 A1 | 3/2009 |
| EP | 0 346 101 A2 | 12/1989 |
| EP | 1 351 000 A1 | 10/2003 |
| EP | 2 511 430 A1 | 10/2012 |
| WO | WO 02/094922 A1 | 11/2002 |
| WO | WO 2010/094528 A1 | 8/2010 |

* cited by examiner

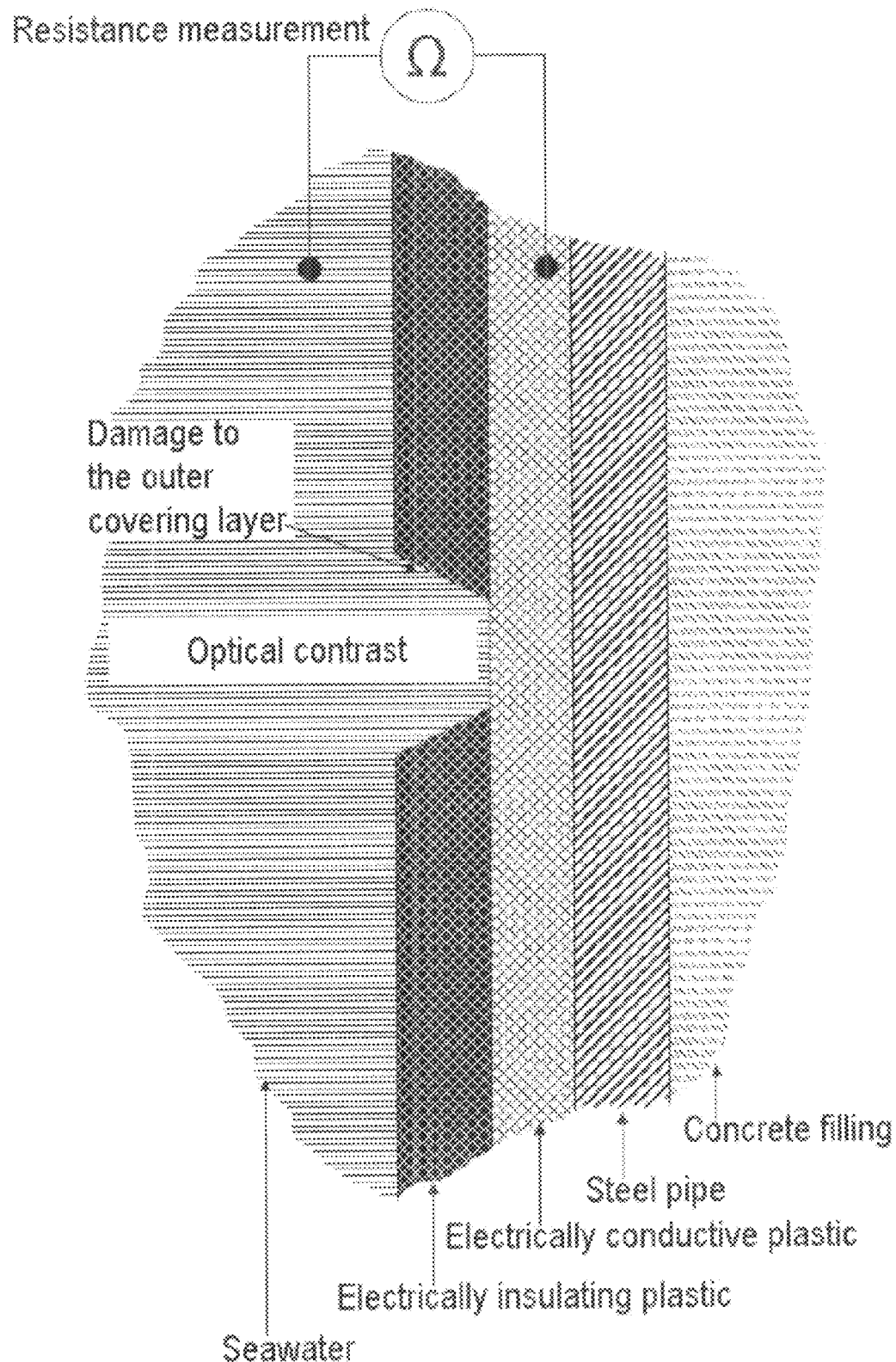

WEAR INDICATOR SYSTEM FOR OFFSHORE CORROSION PROTECTION COVERING SYSTEMS

CROSS REFERENCE TO RELATED APPLICATIONS

This application claims priority to German Application No. 102012207179.2, filed Apr. 30, 2012, the disclosure of which is incorporated herein by reference in its entirety.

BACKGROUND OF THE INVENTION

The invention relates to a wear indicator system for metal pipes which are part of an offshore structure or a pipeline and are covered with a corrosion protection system.

Offshore structure designates stationary structures which are erected in the open sea off the coast. Examples of such offshore structures are wind power plants, drilling rigs and lighthouses. The pipelines in question are rigid pipes having a solid metal wall, as opposed to flexible pipes of multilayer construction.

The metal pipes are, for example, part of the foundation structure of offshore structures. The foundation structure of offshore structures is the area which carries the actual functional unit. In the case of wind power plants, the foundation structure carries the tower including turbine and rotors. In the case of drilling rigs, the foundation structure carries the platform including superstructures. In the case of lighthouses, the foundation structure carries the tower, if present, and the light. The foundation structure lies underwater, in the intertidal zone, in the foam zone and possibly in the aerosol zone. The foundation structure includes the foundation elements with which it is anchored in the sea floor.

In the course of the planned expansion of wind power utilization, a large number of offshore wind power plants are planned for the coming years both in the North Sea and in other seas and in inland seas. The overall mechanical system of an offshore wind power plant comprises the components turbine, rotors, tower and foundation structure.

In order to base these plants on the bottom of the body of water, at locations up to over 100 km from the coast, specific constructions are required, which differ highly from the constructions in the onshore region. Some regions of these complicated constructions, such as monopiles, jackets, tripods, tripiles, etc., are subjected to high static and primarily dynamic and corrosive loading. Depending on the position and water depth at the respectively considered location, what are known as the 50-year wave and the tidal range have to be taken into account. Added to this are high UV radiation, salty spray, foam, aerosols, temperature changes, mechanical loadings, growth with mussels and other life forms and associated mechanical wear by animals and chemical ablation as a result of discharges from animals and other marine life forms. For these constructions, use is made of steel pipes which, for corrosion protection reasons, can be sealed off in an airtight manner or filled with concrete. Furthermore, power or other supply lines can run through the steel construction pipes.

To date, the metal pipes needed for the construction have been designed with substantially thicker wall thicknesses (up to 25%) than directly necessary and conventional paints, mostly based on epoxy resin or polyurethane, are used for the corrosion protection. As a rule, these paint systems do not offer particular protection against mechanical loading. In addition, these frequently have to be applied by hand at great heights, which results in quality control being difficult. The quality of such a coating is not comparable with the coating performed at the factory.

EP 2 511 430 describes that steel construction pipes which are covered with an extruded layer made of a polyamide moulding compound can be used in the foundation structure of offshore structures. Better protection against mechanical loadings and against corrosion and UV irradiation is achieved therewith than in the case of the previously known applicable pipes. The covering can also be formed in multiple layers.

Pipelines made of metal are currently frequently covered with a polyolefin such as polyethylene or polypropylene (WO 2002/094922; US 2002/0066491; EP-A-0 346 101). The coatings or coverings are used primarily for corrosion protection; they are described by corresponding standards. For the polyolefin covering, these are, for example, DIN EN 10288 and DIN 30678. In the case of the polyolefin covering, this layer is produced, for example, by means of tubular or wrapping extrusion. For the purpose of adhesion promotion, epoxy and adhesive layers can be applied one after another before the extrusion.

Conventionally, as regulated by DIN EN 10310 (German version EN 10310:2003), steel pipes for underground and water-laid pipelines are coated by means of polyamide powder. The polyamide coating is applied by dipping in a fluid bed, spraying on or in the roll application process. Because of the process, only relatively thin layers can be applied to the metal by means of powder coating. Disadvantageous in particular is the fact that a powder made of a relatively low-molecular weight polyamide has to be used for the coating, in order to ensure good flow of the melt on the hot metal surface. A coating obtained in this way is primarily used for corrosion protection. Furthermore, thermosetting coatings based on epoxy or polyurethane are also known.

In pipeline construction, higher technical requirements are to an increasing extent being placed on the pipe coating, since the environmental, laying and operating conditions are becoming more and more demanding. One of the most effective methods to protect underground pipelines against corrosion, in particular in the case of cathodic corrosion protection, is a multilayer covering. This consists of an epoxy resin layer as a first layer, a copolymer as adhesive as a second layer and an outer polyolefin layer made of polyethylene or polypropylene. This covering method can be applied to pipes from small to large. However, in the offshore and onshore area, high requirements are often additionally placed on the resistance against mechanical stresses. In order to take this problem into account as well, WO2010/094528 recommends the use of a metallic conduit pipe which is covered with an extruded layer made of a polyamide moulding compound, to produce a pipeline laid in water.

Damage to such corrosion protection coatings leads to the corrosion of the steel construction to be protected and can thus lead to structural endangering of the structure or the pipeline. Conventional procedures, therefore, firstly, primarily in offshore structures, include regular on-site inspection of the corrosion protection; secondly, the steel construction is designed with the inclusion of a safety factor which permits time-limited corrosion of the steel construction caused by damaged protective layers.

Since, for example, offshore wind power plants are not continuously occupied, the inspection of these wind power plants is associated with considerably increased expenditure; a visit to the plant is always necessary. As a result of external influences of the weather and of the sea, a visit or visual inspection of the plant is not always possible, however, which additionally makes the inspection more difficult.

The object of the invention is, therefore, to develop a wear indicator system for corrosion protection covering systems which, even in the case of non-regular occupancy of offshore structures, permits reliable assessment of the corrosion protection. In particular, travelling to these structures should therefore be limited to a minimum and, in addition, the safety margin in designing these structures can be reduced.

SUMMARY OF THE INVENTION

This and other objects have been achieved by the present invention the first embodiment of which includes a corrosion protected metal pipe, comprising:

a metal pipe; and an at least two-layer covering on the pipe having a lower layer facing the pipe and an upper layer on a side of the lower layer not facing the pipe;

wherein the lower layer is electrically conductive and the upper layer is electrically insulating, the lower layer is optically contrasting to the upper layer, or the lower layer is electrically conducting and optically contrasting to the upper layer and the upper layer is electrically insulating.

In a further embodiment of the present invention, the upper and the lower layer each, independently, comprise a polymer material and in an aspect of this embodiment, the upper layer is a polyamide moulding compound applied by extrusion.

In another embodiment of the present invention at least one further layer is between the metal surface and the lower layer and the at least one layer between the metal surface and the lower layer is selected from the group consisting of a ceramic layer, a priming layer, an adhesion promoting layer and a textile reinforcement.

BRIEF DESCRIPTION OF THE DRAWING

FIG. 1 shows a protected pipe structure according to one embodiment of the present invention.

DETAILED DESCRIPTION OF THE INVENTION

The object described above has been achieved by a metal pipe which has an at least two-layer corrosion protection covering with an upper and a lower layer, the lower layer being finished such that, in the event of damage to the layer or layers lying above, a visual or electrical signal can be detected. Thus the metal pipe is covered with an at least two-layer covering having a lower layer facing the pipe and an upper layer on a side of the lower layer not facing the pipe; wherein the lower layer is electrically conductive and the upper layer is electrically insulating, the lower layer is optically contrasting to the upper layer, or the lower layer is electrically conducting and optically contrasting to the upper layer and the upper layer is electrically insulating.

The present invention also includes the use of the corrosion protected metal pipe for installation in an offshore structure, in particular in the foundation structure of an offshore structure, or for producing a pipeline laid in water.

In a first embodiment, the lower layer, which is the layer facing the metal of the pipe, is designed to be electrically conductive, while the upper layer, facing the water, is designed to be electrically insulating. By application of an electric voltage with respect to the water, it may thus possible to detect damage to the coating by means of remote monitoring, as a result of the short circuit that then occurs. The water is preferably water which contains dissolved salts, for example seawater or brackish water. The electrically conductive layer may be insulated with respect to the metal. However, it may also be conductively connected to the metal, so that the metal construction is at the same potential.

In a second embodiment of the present invention, the two layers lying one above the other are constituted in an optically contrasting manner. In general, they differ in colour. If, for example, the upper layer is set to be yellow and the lower layer red, then damage to the upper layer may be detected by means of the occurrence of red areas. The contrast preferably corresponds at least to the grey scale rating of 4 (according to DIN EN 20105-A02), particularly preferably at least to the grey scale rating of 3 and in particular preferably at least to the grey scale rating of ⅔. The measurement may be carried out in accordance with DIN EN ISO 11664-4, using a spectrophotometer (sphere).

In a third possible embodiment of the present invention, the first and the second embodiments are combined with each other. Damage may then be detected by means of the occurrence of a short circuit and reported by remote monitoring; on-site, the damage may then be found and repaired quickly by the optical contrast. This principle is illustrated in FIG. 1.

In FIG. 1, a steel pipe with concrete filling is illustrated, which has been covered with a layer made of an electrically conductive plastic and thereafter with a layer made of an electrically insulating plastic. The two plastic materials are coloured differently. The outer, electrically insulating covering layer has been damaged at a point, so that the electrically conductive layer comes into contact with seawater. As a result, a short circuit is detected via an electric resistance measurement. The damaged point may be found by locating the optical contrast on the pipe.

The electrical conductivity of the lower layer may be obtained by any of conventionally known methods, for example, by using a moulding compound filled with conductive carbon black or by embedding axially extending or wound electric conductors, for example wires, stranded wires or tapes.

The offshore structure may preferably be an offshore wind power plant, a drilling rig or a lighthouse.

The foundation structure of an offshore wind power plant is the structure which carries the tower. It extends from the foundation elements, which are anchored in the sea floor, via the structure which is located underwater, as far as the point at which the tower begins and which may be located above the calm water level.

The following types, for example, are used as the foundation structure:

The monopile construction comprises a cylindrical hollow pile. The monopile is used close to the coast in many European offshore wind parks; it is suitable for foundations at water depths of up to currently about 20 meters. Monopiles can be installed simply and quickly; however, heavy pile driving equipment is needed for the erection. In recent times, trials of a gentle installation using a drill head have been carried out.

The jacket is a latticework construction made of steel which resembles the construction of conventional power masts. At its four feet, the jacket is anchored in the sea floor with piles. The jacket construction has already proven worthwhile in the oil industry at relatively great water depths. As a result of the latticework construction, 40 to 50% steel can be saved as compared with the monopile. Thus, the project costs when this construction is used at relatively great water depths increase only relatively slightly. Since the individual structural elements are relatively small, they can be produced easily and can be transported and mounted simply.

In the case of the tripod, the structure comprises a tripod formed from steel pipes, on which the central pipe is placed centrally. The legs of the tripod can each be seated on a pile or on a plurality thereof. In order to drive the pile, centring sleeves are arranged at the corner points of the equilateral triangle that results. The piles are connected to one another by horizontal struts and connected to the central pipe via diagonal bracing. The central pipe does not enter the sea floor. Since steel pipes having smaller diameters are used in this case, the tripod can be used for water depths of more than 20 meters.

The quadropod is a modification of the tripod concept with four instead of three struts. In this case, increased foundation rigidity is achieved at great water depths.

The tripile comprises three steel piles, which are anchored under water. Above water, a tripod construction is placed on these steel piles. According to manufacturer's information, tripile foundations are suitable for water depths of 25 to 50 meters.

Constructions of this type are described, for example, in the following publications:
   Fundamente für Offshore-Windenergieanlagen [Foundations for Offshore Wind Power Plants], Deutsche Energie-Agentur GmbH, as at 12/09;
   Florian Biehl, Kollisionssicherheit von Offshore-Windenergieanlagen [Collision Safety of Offshore Wind Power Plants], Stahlbau, Vol. 78 (6), pp. 402-409 (2009);
   K. Lesny, W. Richwien (Publishers), Gründung von Offshore-Windenergieanlagen-Werkzeuge für Planung and Bemessung [Foundations of Offshore Wind Power Plants—Tools for Planning and Dimensioning], VGE Verlag Glückauf 2008, ISBN: 978-3-86797-035-8;
   DE 103 10 708 A1.

The upper and the lower layers of the corrosion protection covering according to the present invention may be of a polymer material, for example a polyamide moulding compound, a polyolefin moulding compound, a fluoropolymer moulding compound (for example based on PVDF), a moulding compound based on a thermoplastic polyurethane, a cross-linked polyurethane or a cross-linked epoxy resin.

In a preferred embodiment, the upper layer is a polyamide moulding compound applied by extrusion. The lower layer may then either likewise be a polyamide moulding compound, a polyolefin moulding compound or another polymer material. The material of this lower layer may contain an adhesive resin, for example epoxy resin (for example Araldite®); in this case, this layer can be applied directly to the metal surface.

In general, however, between the metal surface and the lower layer there may be at least one further layer. For example, this at least one further layer may involve one or more of the following layers:
   a ceramic layer, for example, such as described in WO 03/093374;
   a priming layer, for example of epoxy resin (U.S. Pat. No. 5,580,659) or a water-based mixture of epoxy resin and polyacrylate latex (WO 00/04106);
   an adhesion promoter layer made of a polyamide hot-melt adhesive which, for example, can be applied as powder by spraying, etc. (EP 1 808 468 A2), or of a polyolefin which bears functional groups. Suitable functional groups are, for example, carboxyl groups or acid anhydride groups (WO 02/094922), epoxy groups or alkoxysilane groups (EP-A-0 346 101). The polyolefin layer may also be foamed. The polyolefin may preferably be polyethylene or polypropylene;
   a differently composed adhesion promoter, which is intended to ensure that the composite comprising polyamide layer and base material is not impaired under mechanical stress;
   a textile reinforcement in the form of woven fabrics or mats, for example made of glass fibres or aramid fibres (Kevlar).

The optional ceramic layer, priming layer, adhesion promoter layer and/or textile reinforcement may be applied to the pipe in accordance with any conventionally known method.

The materials of the upper and lower layer may be applied to the pipe in accordance with methods which are conventionally known, for example by means of tubular or wrapping extrusion. In one possible variant, both layers, possibly together with an adhesion promoter layer, may be produced and applied by means of co-extrusion of a multilayer composite.

The tubular and the wrapping extrusion are covering methods that have proven worthwhile over a long time for pipes. These methods are described in more detail in the Stahlrohr-Handbuch [Steel Pipe Handbook], 12th edition, pp. 392-409, Vulkan-Verlag Essen, 1995.

The applied layers must be at least so thick that they can be produced as a closed layer under the application conditions. The layer thickness may preferably be at least 0.5 mm, particularly preferably at least 1.0 mm and in particular preferably at least 1.2 mm.

Usually, layer thicknesses up to about 8 mm, preferably up to about 7 mm, particularly preferably up to about 6 mm and in particular preferably up to about 5 mm have proven worthwhile. If required, however, the layer may be thicker, for example up to 30 mm or more.

The metal pipe may be steel, stainless steel, copper, aluminium, cast iron, zinc, alloys with one of these metals as main component, brass, galvanized steel, cadmium-coated steel, aluminium-coated metal, steel coated with metal alloys, such as GALFAN, or of any other metal. The pipe may be produced by all conventional methods, including for example, as welded or seamless pipe.

The outer diameter of the metal pipe may preferably be at least 20 mm and at most 8000 mm.

The individual pipes are connected to one another constructionally by conventionally known methods, for example, by welding.

A particular advantage of the invention is that the damage may be detected and repaired when the metal construction itself has not yet begun to corrode. In this case, the repair may be considerably less complicated overall.

Numerous modifications and variations of the present invention are possible in light of the above description. It is therefore to be understood that within the scope of the appended claims, the invention can be practiced otherwise than as specifically described herein.

The invention claimed is:
1. A corrosion protected metal pipe, comprising:
   a metal pipe; and
   an at least two-layer covering on the pipe having a lower layer facing the pipe and an upper layer on a side of the lower layer not facing the pipe;

wherein
the lower layer is electrically conductive and the upper layer is electrically insulating,
the lower layer is optically contrasting to the upper layer, or
the lower layer is electrically conducting and optically contrasting to the upper layer and the upper layer is electrically insulating, and
wherein a primer layer is not present between the metal pipe and the at least two-layer covering.

2. The corrosion protected metal pipe according to claim 1,
wherein
the lower layer is optically contrasting to the upper layer.

3. The corrosion protected metal pipe according to claim 2, wherein
the optical contrast corresponds at least to a grey scale of 4 according to DIN EN 20105-A02.

4. The corrosion protected metal pipe according to claim 1, wherein
the upper and the lower layer each, independently, comprise a polymer material.

5. The corrosion protected metal pipe according to claim 4,
wherein
the upper layer is a polyamide moulding compound applied by extrusion.

6. The corrosion protected metal pipe according to claim 1,
wherein
the lower layer is electrically conductive and the upper layer is electrically insulating.

7. The corrosion protected metal pipe according to claim 6, wherein the lower layer comprises an electrically conductive material.

8. The corrosion protected metal pipe according to claim 7, wherein the electrically conductive material is selected from the group consisting of conductive carbon black, an axially extending conductive wire or tape and a wound conducting wire or tape.

9. The corrosion protected metal pipe according to claim 2, wherein the lower layer is colored and the color of the lower layer is in optical contrast to a color of the upper layer.

10. The corrosion protected metal pipe according to claim 1, further comprising at least one layer, which is not a primer layer, between the metal surface and the lower layer.

11. The corrosion protected metal pipe according to claim 10, wherein the at least one layer between the metal surface and the lower layer is selected from the group consisting of a ceramic layer, an adhesion promoting layer and a textile reinforcement.

12. The corrosion protected metal pipe according to claim 11, further comprising the adhesion promoting layer and the adhesion promoting layer is a polyamide hot-melt adhesive, or a polyolefin having functional groups.

13. The corrosion protected metal pipe according to claim 11, further comprising a textile reinforcement and the textile reinforcement is a woven fabric or mat.

14. The corrosion protected metal pipe according to claim 1, wherein the pipe metal is a metal material selected from the group consisting of steel, stainless steel, copper, aluminium, cast iron, zinc, an alloy comprising copper, aluminum or zinc as a main component, brass, galvanized steel, cadmium-coated steel, aluminium-coated metal, and steel coated with a metal alloy.

15. A corrosion protected metal pipe, comprising:
a metal pipe; and
an at least two-layer covering on the pipe having a lower layer facing the pipe and an upper layer on a side of the lower layer not facing the pipe;
wherein
the lower layer is electrically conductive and the upper layer is electrically insulating,
the lower layer is optically contrasting to the upper layer, or
the lower layer is electrically conducting and optically contrasting to the upper layer and the upper layer is electrically insulating, and
said lower layer of the at least two-layer covering is directly on and in contact with the metal pipe.

16. The corrosion protected metal pipe according to claim 15,
wherein
the lower layer is electrically conductive and the upper layer is electrically insulating.

17. The corrosion protected metal pipe according to claim 16, wherein the lower layer comprises an electrically conductive material.

18. The corrosion protected metal pipe according to claim 15,
wherein
the lower layer is optically contrasting to the upper layer.

19. The corrosion protected metal pipe according to claim 18, wherein
the optical contrast corresponds at least to a grey scale of 4 according to DIN EN 20105-A02.

20. The corrosion protected metal pipe according to claim 15, wherein
the upper and the lower layer each, independently, comprise a polymer material.

21. The corrosion protected metal pipe according to claim 20,
wherein
the upper layer is a polyamide moulding compound applied by extrusion.

22. The corrosion protected metal pipe according to claim 16, wherein the electrically conductive material is selected from the group consisting of conductive carbon black, an axially extending conductive wire or tape and a wound conducting wire or tape.

23. The corrosion protected metal pipe according to claim 18, wherein the lower layer is colored and the color of the lower layer is in optical contrast to a color of the upper layer.

24. The corrosion protected metal pipe according to claim 15, wherein the pipe metal is a metal material selected from the group consisting of steel, stainless steel, copper, aluminium, cast iron, zinc, an alloy comprising copper, aluminum or zinc as a main component, brass, galvanized steel, cadmium-coated steel, aluminium-coated metal, and steel coated with a metal alloy.

* * * * *